United States Patent [19]
Han

[11] Patent Number: 5,235,575
[45] Date of Patent: Aug. 10, 1993

[54] APPARATUS AND METHOD FOR SUCCESSIVE REPRODUCING IN AN OPTICAL DISC RECORDING/REPRODUCING SYSTEM

[75] Inventor: Yeon-tak Han, Suwon, Rep. of Korea

[73] Assignee: SamSung Electronics Co., Ltd., Suwon, Rep. of Korea

[21] Appl. No.: 826,525

[22] Filed: Jan. 27, 1992

[30] Foreign Application Priority Data

May 11, 1991 [KR] Rep. of Korea ............... 91-7634

[51] Int. Cl.$^5$ ............................... G11B 7/00
[52] U.S. Cl. ....................... 369/32; 369/60; 369/48; 369/44.320; 369/195
[58] Field of Search ............... 369/32, 43, 48, 44.32, 369/50, 58, 60, 195; 360/72.1, 77.04, 10.1, 38.1

[56] References Cited
U.S. PATENT DOCUMENTS 4,743,979  5/1988  Okano et al. ............. 360/10.1
4,903,140  2/1990  Okamoto et al. ........... 369/32

*Primary Examiner*—Aristotelis Psitos
*Assistant Examiner*—Nabil Hindi
*Attorney, Agent, or Firm*—Robert E. Bushnell

[57] ABSTRACT

An apparatus and method for successive reproducing in an optical disc recording/reproducing system, can perform the conventional successive reproducing function plus a successive reproducing function capable of generating a reproducing signal while transferring the pickup. For this special successive reproduction, the apparatus has a memory which outputs reproducing information of a second reproducing side which has been previously stored during the time period required for both transferring the pickup and skipping portions of the disc to prevent repeated reproduction, and key input unit including separate control keys for selecting normal successive reproduction and special successive reproduction or a single mode selecting key, so that the user can selectively reproduce disc information as desired. In the special successive reproducing mode, reproduction continues with an uninterrupted supply of the reproducing signal.

29 Claims, 4 Drawing Sheets

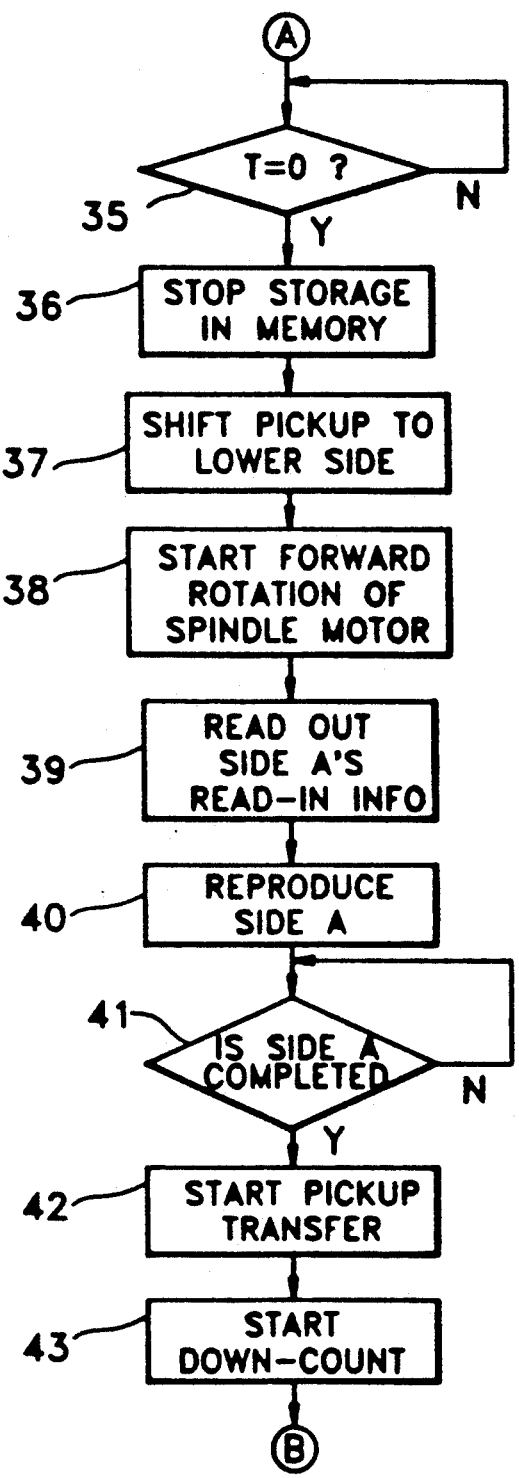

APPARATUS AND METHOD FOR SUCCESSIVE REPRODUCING IN AN OPTICAL DISC RECORDING/REPRODUCING SYSTEM

BACKGROUND OF THE INVENTION

The present invention relates to an optical disc recording/reproducing system, and particularly to an apparatus and a method for the successive reproduction of information recorded on both sides of a disc.

Generally, an optical disc recorder/reproducer is used for recording or reproducing information on one or both sides of a disc. In most cases, since the amount of information capable of being processed on both sides of a disc is double that of one side, one-sided discs handle audio information only, whereas using both sides allows for not only audio information but also video information. The successive reproducing function is adapted when information is recorded on both sides.

Conventionally, for normal seating of a disc adjacent to a pickup (i.e., the disc is placed such that the downward side is side A which is the first side reproduced, and the upward side is side B which is reproduced second), the read-in area of side A is read out using the pickup controlled by a feed motor and servo circuit. Then, the information area of side A is read out and reproduced to its outermost circumference. Thereafter, to reproduce side B, the pickup is transferred to the innermost circumference of side B (upper side). Like the reproduction of side A, the read-in area and information area of side B are read out and reproduced using the pickup to the outermost circumference. At this time, a problem occurs in that after performing the reproduction of side A, no substantial reproducing signal is generated while transferring the pickup to reproduce side B.

SUMMARY OF THE INVENTION

Therefore, it is an object of the present invention to provide an apparatus and a method for successive reproducing in an optical disc recording/reproducing system, to generate a reproducing signal while transferring a pickup.

It is another object of the present invention to provide an apparatus and a method for successive reproducing in an optical disc recording/reproducing system, which can perform the conventional successive reproducing function plus a successive reproducing function capable of generating a reproducing signal while transferring the pickup, and the successive reproducing is performed in accordance with a user's preference.

To achieve these and other objects of the present invention, there is provided an apparatus for successive reproducing in an optical disc recording/reproducing system for reproducing information recorded on both sides of a disc, including a pickup for picking up the information from the disc, and a pickup transferring device for transferring the pickup to upward and downward sides of the disc, the apparatus for successive reproducing comprises:

a key input device capable of supplying a mode control signal by separately discriminating a normal successive reproduction mode and a special successive reproduction mode;

a memory for storing information from a predetermined section of a second reproducing side of the disc, when the special successive reproduction mode is set by the key input device; and a system controller for controlling the storage and read-out operations of the memory in accordance with information picked up by the pickup.

A method suitable for driving the apparatus for successive reproducing in an optical disc recording/reproducing system, comprises the steps of:

key checking to check whether or not the function key pressed through the key input device is a control signal key of a special successive reproduction mode;

a first successive reproducing to perform a normal successive reproducing operation which transfers the pickup after reproducing the first reproducing side of the disc when a control signal key of a normal successive reproduction mode is pressed in the key checking step, and reproduces the second reproducing side of the disc; and a second successive reproducing to perform a special reproducing operation which also outputs a reproducing signal during transferring the pickup when a control signal key of the special successive reproduction mode is pressed in the key checking step.

BRIEF DESCRIPTION OF THE DRAWINGS

The foregoing and other objects, advantages and aspects of the present invention will be better understood from the following detailed description of the invention with reference to the accompanying drawings, in which:

FIGS. 2A to 2C are flowcharts illustrating the operation of the apparatus for successive reproducing in FIG. 1.

DETAILED DESCRIPTION OF THE INVENTION

Figure 1:
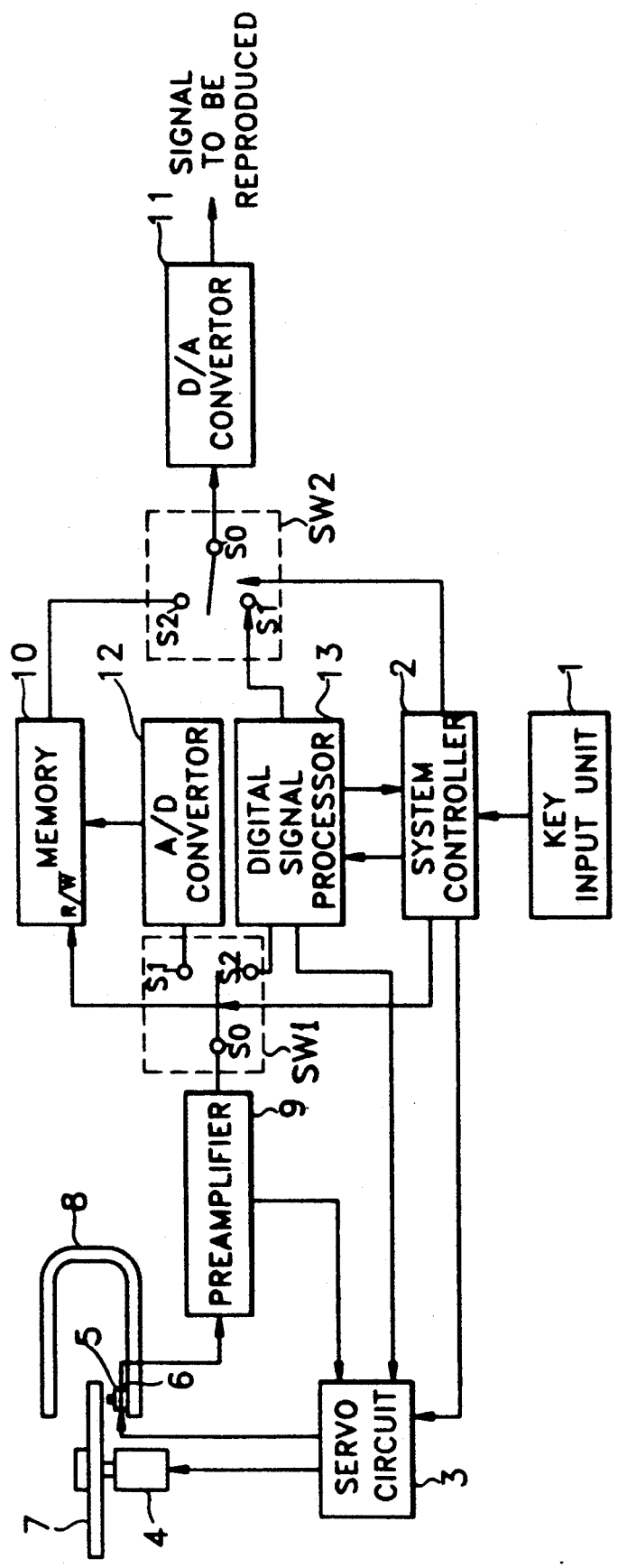
FIG. 1 is a block diagram of an apparatus for successive reproducing according to the present invention.

An apparatus for successive reproducing illustrated in FIG. 1 of the present invention is composed of: an optical disc 7 having information recorded on both sides in a normal recording format; a spindle motor 4, a pickup 5, and a feed motor 6 which are all positioned below the optical disc 7; a U-shaped pickup transferring device 8 centered around the optical disc 7; a servo circuit 3 connected to control the operations of the spindle motor 4, pickup 5, and feed motor 6; a preamplifier 9 whose input is connected to the output of pickup 5 and whose output is connected to the input of servo circuit 3; a digital signal processor 13 for receiving the output signal of preamplifier 9 as an input signal, one output of which is connected to the input of servo circuit 3; an A/D converter 12 for analog-to-digital converting the output signal of preamplifier 9; a first control switch SWI whose reference contact point S0 is connected to the output of preamplifier 9, first contact point S1 is connected to the input of A/D converter 12, and second contact point S2 is connected to the input of digital signal processor 13; memory 10 whose input is connected to the output of A/D converter 12 for storing the information of a predetermined period; a second control switch SW2 for selectively outputting signals by contacting respective contact points S1 and S2 to the outputs of memory 10 and digital signal processor 13; a D/A converter 11 for converting the signal from second control switch SW2 into an analog signal, and outputting the analog signal; a system controller 2 connected to servo circuit 3, digital signal processor 13, first and second control switches SW1 and SW2, and memory 10; and a key input unit 1 for providing a control command and information designated by a user to system controller 2.

FIG. 2 is a flowchart illustrating the operation of the apparatus for successive reproducing in FIG. 1, wherein steps 20 through 22 are performed for key checking, 23 through 28 for first successive reproducing, 29 through 51 for second successive reproducing, and step 52 is for carrying out other unrelated functions.

The operation of the apparatus in FIG. 1 will now be described with reference to FIGS. 2A through 2C.

Figure 2A:
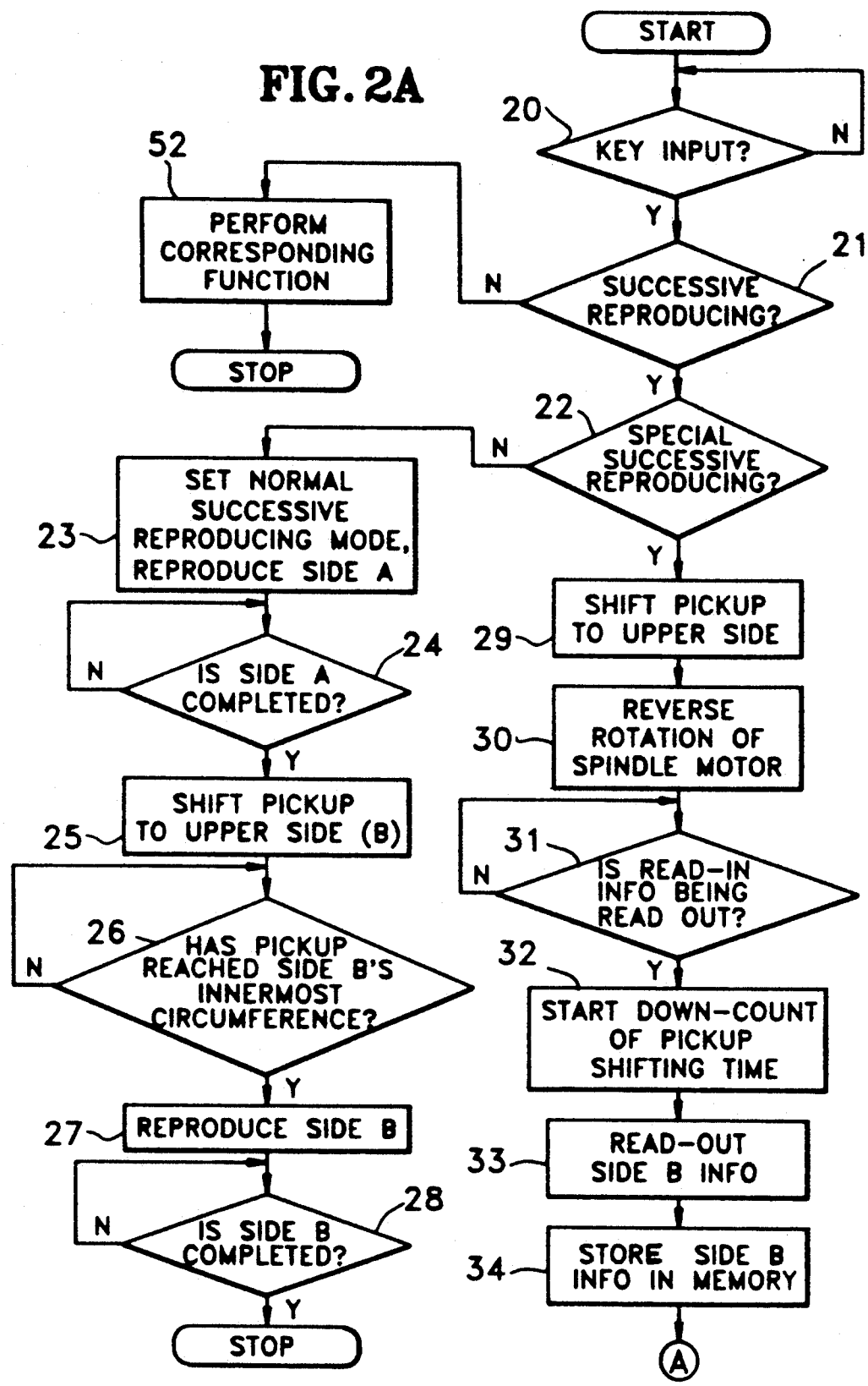

Referring to FIG. 2A, key input unit 1 is composed of function keys capable of applying user-designated control commands and information. Especially, control keys for a normal successive reproduction mode and a special successive reproduction mode are separately provided or a single mode selecting key is provided, thereby enabling the user to select modes as desired. Here, the normal successive reproduction mode is where no reproducing signal is output while transferring pickup 5 from the first reproducing side to the second reproducing side, and the special successive reproduction mode is where a reproducing signal is output during the transferring.

Accordingly, when the user presses the special successive reproduction mode key on key input unit 1, system controller 2 recognizes that the applied key control signal stipulates the special successive reproduction mode, and then outputs a control signal to servo circuit 3 (steps 20, 21, and 22). If the applied mode control signal is for normal successive reproduction, side A which is the first reproducing side is reproduced conventionally (step 23). Upon completion of the reproducing operation (step 24), pickup 5 is transferred to the innermost circumference of the second reproducing side of disc 7 (steps 25 and 26), and then, side B which is the second reproducing side is reproduced (steps 27 and 28). When some other function control signal is applied via key input unit 1 in step 20, system controller 2 performs the corresponding operation (step 52).

When the control signal for the special successive reproduction mode is applied, system controller 2 shifts pickup 5 along pickup transfer 9 to the innermost circumference of side B which is the second reproducing side of disc 7, under the control of servo circuit 3 and feed motor 6 (step 29). Then, spindle motor 4 is controlled to reversely rotate (step 30), and finally, the movement of pickup 5 is controlled using feed motor 6 to pickup the read-in information on side B. If the read-in information on side B is being read out, a counter (not shown) within system controller 2 starts down-counting (steps 31 and 32). Here, the counting value of the counter is the same as the period required for transferring pickup 5 to the starting point for reproducing side B after completing the reproducing of side A, which also includes the elapsed time for skipping the already reproduced section. At the same time, the information recorded on side B is read out (step 33), and stored in memory 10 (step 34).

Referring to FIG. 2B, under the control of system controller 2, memory 10 is set to a recording (write) mode while pickup 5 reads out the read-in information of side B, and is supplied with the information picked up by pickup 5 and output through preamplifier 9. That is to say, in accordance with the result of switching of first control switch SWI, the output signal of preamplifier 9 can be supplied to either memory 10 or digital signal processor 13. Here, first control switch SWI is switching to supply the output signal to memory 10. The signal supplied through first control signal SWI is digitized in A/D converter 12, and then supplied to memory 10. The switching of first control switch SWI is controlled by system controller 2.

Such storage operation continues until the counter within system controller 2 reaches zero (step 35). (At this point, memory 10 may be replaced with a frame memory.) When the counting value reaches zero, system controller 2 supplies a control signal to memory 10 and a first control switch SWI, stopping the storage operation of memory 10 (step 36).

Next, pickup 5 is controlled by feed motor 6 to be transferred to the innermost circumference of the first reproducing side of disc 7 (step 37), and spindle motor 4 is forwardly rotated (step 38). Using pickup 5, the information is picked up from the read-in area to the outermost circumference of side A (steps 39 and 40), and then output to preamplifier 9. Preamplifier 9 amplifies the signal picked up from pickup 5 under the control of feed motor 6 and servo circuit 3 which includes focusing servo control and tracking servo control, eliminates noise and distortion, and outputs the signal to first control switch SWI after performing waveform-shaping. At this time, first control signal SWI is switched to second contact point S2, thereby supplying the signal from preamplifier 9 to digital signal processor 13. As a well-known circuit in the art, digital signal processor 13 demodulates the signal to restore the original signal before recording, and outputs the demodulated signal to D/A converter II, which performs eight-to-fourteen modulation (EFM). Here, the output signal of digital signal processor 13 is supplied to D/A converter 11 via second control switch SW2. Second control switch SW2 which selectively allows the signal from memory 10 or digital signal processor 13 to pass, is switched to first contact point SWI during the normal reproduction mode. Here, normal reproduction mode is when the signal output from digital signal processor 13 is supplied to D/A converter 11. The switching of second control switch SW2 is controlled by system controller 2, as is first control switch SW1. D/A converter 11 analog-converts the supplied digital signal and outputs the signal to be reproduced.

When side A is completely reproduced (steps 40 and 41), pickup 5 starts being transferred along pickup transfer 9 to the innermost circumference of the upward side (step 42). Concurrently, system controller 2 sets memory 10 to the read-out mode in accordance with the detection of read-out information on side A, and begins the down-counting of the counter which is the same counter used during storage (step 43).

Figure 2C:
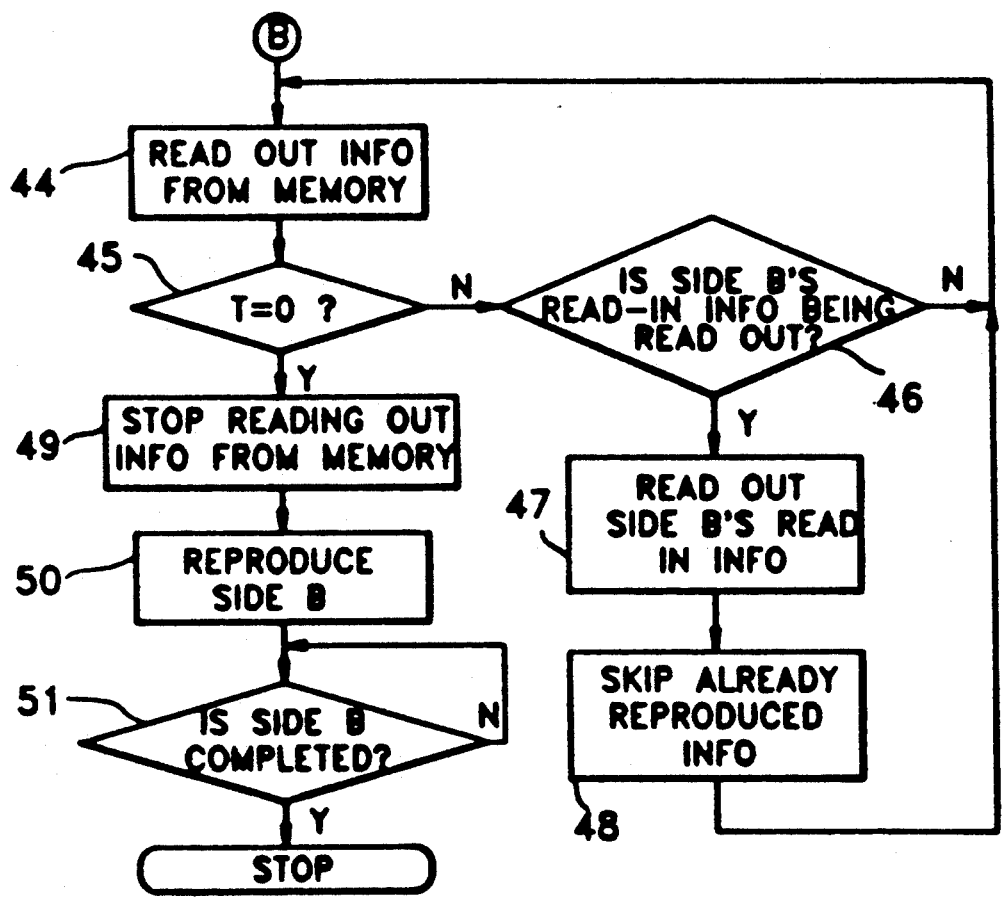

Referring to FIG. 2C, system controller 2 also switches second control switch SW2 from first contact point S1 to second contact point S2. Accordingly, the information stored in memory 10 is supplied to D/A converter 11 and output (step 44). This operation continues until the down-counting value of the system controller's counter reaches zero as the storage operation.

When the counting value of the counter within system controller 2 reaches zero, system controller 2 supplies a control signal to both memory 10 and second control switch SW2. By this operation, the read out mode in memory 10 is released and second control switch SW2 is switching from second contact point S2 to first contact point S1. As a result, the read-out of memory 10 stops (step 49). Here, the down-counting period includes not only the time taken to transfer pickup 5 to the innermost circumference of the upward side but also the period required to read out the read-in area plus skipping portions to prevent the reproduction of information already stored in memory 10 (steps 46 through 48). The reproduction of side B by pickup 5 is performed from the point after skipping to reproduce side B to the outermost circumference thereof (steps 50 and 51).

In the present invention as described above, a special successive reproducing control can be performed in an optical disc recording/reproducing system for recording or reproducing the information on both sides of a disc, which enables a reproducing signal to be output during the transfer of the pickup, and to continue without cessation. Further, in accordance with the user's preference, successive reproducing can be selectively performed by utilizing separate control keys for special successive reproduction and the conventional normal successive reproduction or a single mode selecting key.

What is claimed is:

1. An apparatus for successive reproducing in a optical disc recording/reproducing system for reproducing information recorded on both sides of a disc, including pickup means for picking up said information from said disc, and pickup transferring means for transferring said pickup means between a first side and a second side of said disc, said apparatus comprising:
    key input means capable of supplying a mode control signal indicative of a user selected one of a normal successive reproduction mode and a special successive reproduction mode;
    memory means for storing information from a predetermined section of said second side of said disc in response to selection of said special successive reproduction mode and providing the stored information during transferring of said pickup means; and
    a system controller for controlling storage and read-out operations of said memory means in accordance with said information picked up by said pickup means.

2. An apparatus for successive reproducing as claimed in claim 1, further comprising a digital signal processor for demodulating said information picked up by said pickup means.

3. An apparatus for successive reproducing as claimed in claim 2, further comprising first selecting means for selectively providing said information picked up by said pickup means to either said memory means or said digital signal under the control of said system controller.

4. An apparatus for successive reproducing as claimed in claim 3, wherein in response to selection of said special successive reproducing mode said pickup means reads read-in information on said second reproducing side, said system controller controls said memory means to be in a recording mode, and controls said first selecting means to supply said information picked up by said pickup means to said memory means.

5. An apparatus for successive reproducing as claimed in claim 4, wherein said first selecting means comprises a control switch.

6. An apparatus for successive reproducing as claimed in claim 5, wherein said system controller controls said memory means to be in said recording mode for a time period corresponding to a time required to transfer said pickup means to the starting point of said second side after completing reproduction from said first side.

7. An apparatus for successive reproducing as claimed in claim 6, wherein said time period further includes a time required for said pickup means to skip a portion of said second side where information reproduced from said memory means is stored.

8. An apparatus for successive reproducing as claimed in claim 7, wherein said time period is counted by a counter within said system controller.

9. An apparatus for successive reproducing as claimed in claim 3, further comprising second selecting means controlled by said system controller to selectively provide a signal from either said memory means or said digital signal processor.

10. An apparatus for successive reproducing as claimed in claim 9, wherein said system controller enables said memory means to a read-out mode when the read out information of said first side is read out, and controls said second selecting means to allow information read out from said memory means to pass.

11. An apparatus for successive reproducing as claimed in claim 10, wherein said system controller controls said memory means to be in said recording mode for a time period corresponding to a time required to transfer said pickup means to the starting point of said second side after completing reproduction from said first side.

12. An apparatus for successive reproducing as claimed in claim 11, wherein said time period further includes a time required for said pickup means to jump a portion of aid second side where the information already reproduced from said memory means is stored.

13. An apparatus for successive reproducing as claimed in claim 12, wherein said time period is counted by a counter within said system controller.

14. An apparatus for successive reproducing as claimed in claim 12, wherein said first selecting means comprises a control switch.

15. A method for driving an apparatus for successive reproducing in an optical disc recording/reproducing system including a disc, a pickup device, pickup transferring device a key input device having a function key controlling a normal successive reproducing mode and a special successive reproducing mode, a memory device, and a system controller, said memory comprising:
    key checking to check whether or not a selected function key of said key input means is the function -key for said special successive reproducing mode;
    performing a normal successive reproducing operation including transferring said pickup means after reproducing from a first reproducing side of said disc when said function key is indicative of said normal producing mode and reproduces a second reproducing side of said disc; and
    performing a special successive reproducing operation including generating a reproduced signal during the transfer of said pickup device when the selected function key is indicative of said special successive reproduction mode.

16. A method for successive reproducing as claimed in claim 15, wherein said special successive reproducing operation comprises:
    storing an amount of said disc information in said memory means corresponding to a time required for transferring said pickup while performing said normal successive reproduction mode;

after reproducing from said first reproducing side, transferring said pickup to the innermost circumference of said second reproducing side;

reproducing said information stored in said memory during said transferring; and performing the reproduction from the second reproducing side of said disc.

17. A method for successive reproducing as claimed in claim 16, wherein said performing the reproduction from said second reproducing side comprises skipping the information area already stored in said memory means, after said pickup device is transferred along said pickup transferring device to the innermost circumference of said second reproducing side.

18. An apparatus for successively reproducing data signals recorded on both sides of an optical disc, said apparatus comprising:

pickup means for detecting said data signals from said disc;

pickup transferring means for transferring said pickup means between a position for reading from a first side of said optical disc and a position for reading from a second side of said optical disc; and memory means for storing a portion of said data signals recorded on said second side, and for providing said portion of said data signals during transferring of said pickup means from said first side to said second side.

19. An apparatus as claimed in claim 18, further comprising digital-to-analog converting means for alteratively converting said digital signals detected by said pickup means and said portion of said data signals provided by said memory means into analog audio signals.

20. An apparatus as claimed in claim 19, further comprising said digital-to-analog converting means converting said portion of said data signals stored by said memory means into analog audio signals during said transferring of said pickup means from said first side to said second side.

21. An apparatus as claimed in claim 18, further comprising:

preamplifier means for processing said data signals detected by said pickup means and then providing said data signals to said memory means and to a conduction path bypassing said memory means; and digital-to-analog converting means for selectively receiving said data signals from either said memory means or from said conduction path bypassing said memory means.

22. An apparatus as claimed in claim 18, further comprising:

preamplifier means for amplifying and shaping said data signals detected by said pickup means and then providing said data signals;

digital signal processing means for processing said data signals;

first switching means for selectively providing said data signals provided by said preamplifier means to one of said memory means and said digital signal processing means;

second switching means for selectively providing one of said data signals processed by said digital signal processing means and said data signals stored by said memory means; and digital-to-analog converting means for converting said data signals provided by said second switching means to analog audio signals.

23. A method for successively reproducing data signals recorded on both sides of an optical disc, said method comprising:

detecting said data signals from said disc with an optical pickup device;

transferring said optical pickup device between a position for reading from a first side of said optical disc and a position for reading from a second side of aid optical disc;

providing a portion of said data signals from said second side and stored in a memory during said transferring of said pickup means from said first side to said second side; and processing said data signals detected by said optical pickup device when said optical pickup head is detecting said data signals and processing said portion of said data signals during said transferring.

24. An method for successively reproducing data signals recorded on both sides of an optical disc, said method comprising:

detecting a portion of said data signals recorded on a beginning section of a second side of said optical disc with an optical pickup device and storing said portion of said data signals in a memory;

detecting and processing said data signals from a first side of said optical disc with said optical pickup device;

in response to reaching an end section of said first side, transferring said optical pickup device from said first side to said second side of said optical disc and processing said portion of said data signals stored in said memory during said transferring of said optical pickup device; and detecting and processing said data signals from said second side of said optical disc with said optical pickup device.

25. A method as claimed in claim 24, wherein processing said data signals from said first side, processing said data signals stored in said memory, and processing said data signals from said second side comprises converting said data signals to analog audio signals.

26. A method as claimed in claim 24, wherein detecting and processing said data signals from said second side comprises skipping over said beginning section of said second side.

27. A method as claimed in claim 24, wherein detecting and processing said data signals from said second side comprises sipping over a region of said second side corresponding to said data signals which were stored in said memory and have been processed during said transferring.

28. A method as claimed in claim 26, wherein processing said data signals from said first side, processing said data signals stored in said memory, and processing said data signals from said second side comprises converting said data signals to analog audio signals.

29. An apparatus for successive reproducing as claimed in claim 1, further comprising:

a digital signal processor for demodulating said information picked up by said pickup means; and first selecting means for selectively providing said information picked up by said pickup means to either said memory means or said digital signal processor under the control of said system controller.

* * * * *

UNITED STATES PATENT AND TRADEMARK OFFICE
CERTIFICATE OF CORRECTION

PATENT NO. : 5,235,575
DATED : August 10, 1993
INVENTOR(S) : Yeon-tak Han

It is certified that error appears in the above-indentified patent and that said Letters Patent is hereby corrected as shown below:

IN THE CLAIMS

| | | |
|---|---|---|
| Column 5, | Line 52, | After "signal", Insert --processor-- ; |
| Column 6, | Line 33, | Change "aid" to --said-- ; |
| | Line 44, | After "device", Insert comma --,-- ; |
| | Line 55, | Change "producing" to --reproducing-- ; |
| Column 8, | Line 12, | Change "aid" to --said-- ; |
| | Line 50, | Change "sipping" to --skipping-- . |

Signed and Sealed this

Eighteenth Day of October, 1994

Attest:

BRUCE LEHMAN

*Attesting Officer*     *Commissioner of Patents and Trademarks*